US012280588B2

(12) United States Patent
Escudero Verchili et al.

(10) Patent No.: US 12,280,588 B2
(45) Date of Patent: Apr. 22, 2025

(54) METHODS AND SYSTEMS FOR DRYING COLOR-PRINTED SUBSTRATES

(71) Applicant: Electronics for Imaging, Inc., Londonberry, NH (US)

(72) Inventors: Manuel Escudero Verchili, Almazora (ES); Jorge Murria de las Heras, Almazora (ES); Juan Escudero Gonzalez, Almazora (ES)

(73) Assignee: ELECTRONICS FOR IMAGING, INC., Londonderry, NH (US)

( * ) Notice: Subject to any disclaimer, the term of this patent is extended or adjusted under 35 U.S.C. 154(b) by 188 days.

(21) Appl. No.: 18/184,589

(22) Filed: Mar. 15, 2023

(65) Prior Publication Data

US 2024/0300250 A1 Sep. 12, 2024

(30) Foreign Application Priority Data

Mar. 9, 2023 (EP) .................................... 23382222

(51) Int. Cl.
*B41J 11/00* (2006.01)
*B41J 2/045* (2006.01)
*B41J 2/13* (2006.01)
*B41J 2/21* (2006.01)

(52) U.S. Cl.
CPC ......... *B41J 11/0021* (2021.01); *B41J 2/0456* (2013.01); *B41J 2/13* (2013.01); *B41J 2/2103* (2013.01); *B41J 2/2107* (2013.01)

(58) Field of Classification Search
CPC ............ B41J 11/00214; B41J 11/00212; B41J 11/00218; B41J 11/0021; B41M 7/0081; B41M 5/0047; B41F 23/0409; B41F 23/0453
See application file for complete search history.

(56) References Cited

U.S. PATENT DOCUMENTS 6,550,905 B1 * 4/2003 Deckers ............... C09D 11/101 347/100
7,232,212 B2 * 6/2007 Iwase ................. B41J 11/00214 347/101
7,399,793 B2 * 7/2008 Braun ................. C08F 290/141 427/508

(Continued)

OTHER PUBLICATIONS

"Digital Light Processing", retrieved online from url: https://en.wikipedia.org/wiki/Digital_Light_Processing; edited Jan. 6, 2023, 8 pages.

(Continued)

*Primary Examiner* — John Zimmermann
(74) *Attorney, Agent, or Firm* — PERKINS COIE LLP

(57) ABSTRACT

Apparatus, methods, and systems for dynamically modulating radiation energy in a printing system are disclosed. A system receives data comprising an image pattern for depositing ink on a substrate. The system determines one or more ink properties for the ink configured to be deposited onto the substrate. The ink properties and/or a color of the substrate are used to determine a corresponding energy level value for a radiation lamp. The ink is deposited in the image pattern on the substrate. One or more radiation lamps heat the substrate and the ink, wherein the radiation lamps are configured with the corresponding energy level values.

20 Claims, 10 Drawing Sheets

(56) References Cited

U.S. PATENT DOCUMENTS

| | | | | |
|---|---|---|---|---|
| 7,638,780 | B2 * | 12/2009 | Kilburn | F26B 3/28 118/620 |
| 8,699,921 | B2 | 4/2014 | Petermann | |
| 10,144,209 | B2 * | 12/2018 | Franz | B41F 11/02 |
| 2006/0290760 | A1 * | 12/2006 | German | B41J 11/00212 347/102 |
| 2009/0207223 | A1 * | 8/2009 | Cofler | B41J 11/00218 118/620 |
| 2013/0050367 | A1 * | 2/2013 | Hoogmartens | B41J 2/2107 522/167 |
| 2016/0257135 | A1 * | 9/2016 | Grigore | B41M 5/007 |

OTHER PUBLICATIONS

"Liquid crystal on silicon", retrieved online from url: https://en.wikipedia.org/wiki/Liquid_crystal_on_silicon; 5 pages.

Somi, Mai , et al., "Measurement of Wet Color Change of Bricks During Drying", Journal of Structural and Construction Engineering, vol. 85, No. 777, Jan. 2020, 7 pages.

* cited by examiner

METHODS AND SYSTEMS FOR DRYING COLOR-PRINTED SUBSTRATES

CROSS-REFERENCE TO RELATED APPLICATION

This application claims the benefit of and right of priority to European Patent Application No. 23382222, filed on Mar. 9, 2023, which is incorporated in its entirety herein.

FIELD OF THE INVENTION

This description relates generally to a drying system for a printing process.

BACKGROUND

Printing technology enables production of high-quality, detailed images, and is widely known for versatility in handling a wide range of media, such as paper, cardstock, glossy photo paper, fabric, etc. Printing technology is compatible with different types of inks (e.g., dye-based inks, pigment-based inks, solvent-based inks) including water-based inks. Water-based inks are especially useful for digital printing due to the advantages they offer. As water-based inks use water as a primary solvent rather than chemical solvents, they are considered to be more environmentally friendly and safer. For example, water-based inks have low toxicity and are biodegradable, safer for food packaging, energy efficient, and cost-effective. Although there are many benefits to water-based inks, there are challenges to using water-based inks effectively in digital printing. To dry a water-based ink, chemical and physical drying methods are often not sufficient.

SUMMARY

This specification describes methods, systems and apparatuses for drying color-printed substrates. To reduce warping of a printed substrate and to reduce the energy consumption in the drying and cooling process, the energy used by infrared (IR) lamps in the drying process is modulated. One or more IR lamps, e.g., for a drying process, is configured based on the properties of the water-based ink deposited on a substrate and/or the properties of the substrate itself. In some examples, rather than or in addition to water-based inks, the ink is an ultraviolet (UV) ink, dye-based ink, pigment-based ink, oil-based ink, and/or a solvent-based ink. In some examples, the lamps are configured based on other parameters such as environmental temperature, environmental humidity, types of lamps and drying systems, and/or a speed of the belt (e.g., which conveys the substrate through the printing system.

In some embodiments, a printing system receives an image pattern for depositing ink onto a surface of a substrate to print the image pattern on the substrate. The image pattern comprises a plurality of segments corresponding to a plurality of areas on the surface of the substrate. For each segment of the plurality of segments of the image pattern, one or more ink properties of a corresponding portion of the ink to be deposited onto a corresponding area of the plurality of areas on the surface of the substrate are determined. Using one or more sensors of the printing system, a color of the substrate is determined onto which the image pattern is configured to be printed. In some embodiments, the printing system is an inkjet printing system, a dye-sublimation printing system, a laser printing system, an electrophotographic printing system, and/or an offset printing system.

For each segment of the plurality of segments of the image pattern, a corresponding energy level for a respective radiation lamp of one or more radiation lamps is determined based on the color of the substrate and the one or more ink properties of the corresponding portion of the ink to be deposited to dry the corresponding portion of the ink. The one or more radiation lamps can be an array with at least one dimension of the array corresponding to the plurality of segments of the image pattern. Providing the corresponding energy level causes a reduced energy consumption for the printing system. By a mechanism of the printing system, the ink is deposited according to the image pattern onto the surface of the substrate. Each radiation lamp is configured to provide the corresponding energy level to the corresponding area on the surface of the substrate. Using the radiation lamps, the ink deposited onto the surface of the substrate is heated to dry the ink.

Alternatively or additionally, the corresponding energy level is determined based on other factors, such as environmental temperature, environmental humidity, type of lamps used, types of drying system used and/or a speed of the belt. In some examples, the system includes a temperature or humidity sensor and uses the sensor(s) to detect other factors such as environmental temperature and/or humidity and adjusts the corresponding energy level as described herein. For example, high humidity and/or low temperature can indicate that a higher energy level is required, while a high temperature or low humidity indicates that the energy level should be lowered. As described herein, a model can take in as input the one or more different properties of the ink and/or substrate, and additionally or alternatively take in as input other factors (e.g., temperature, humidity, lamp type, drying system, speed of belt, etc.) and determine the corresponding energy level. In some examples, the model is a trained model such as a machine learning model. For example, the model is trained on a training dataset including an optimal corresponding energy level based on the different factors.

In some embodiments, one or more processors receive the image pattern for depositing the ink onto the substrate and cause a color sensor to determine a color of the substrate. The processor(s) determine, based on the color of the substrate, an energy level for one or more radiation lamps to dry the ink on the substrate. Providing the energy level causes reduced energy consumption for the printing system. The processor(s) cause a mechanism (e.g., inkjet mechanism) to deposit the ink onto the substrate and configure the radiation lamps to provide the energy level to the substrate to dry the ink.

In some embodiments, one or more processors receive an image pattern for depositing ink onto a substrate to print the image pattern on the substrate. The image pattern includes a plurality of segments corresponding to a plurality of areas on the substrate. For each segment of the plurality of segments of the image pattern, a feature vector is extracted. For example, the feature vector is indicative of one or more colors of a corresponding portion of the ink to be deposited onto a corresponding area of the substrate. A trained model determines, based on the feature vector, a corresponding energy level for a respective radiation lamp to dry the corresponding portion of the ink.

These and other aspects, features, and implementations can be expressed as methods, apparatus, systems, components, program products, means or steps for performing a function, and in other ways. These and other aspects, features, and implementations will become apparent from the following descriptions, including the claims.

DETAILED DESCRIPTION

Figure 1:
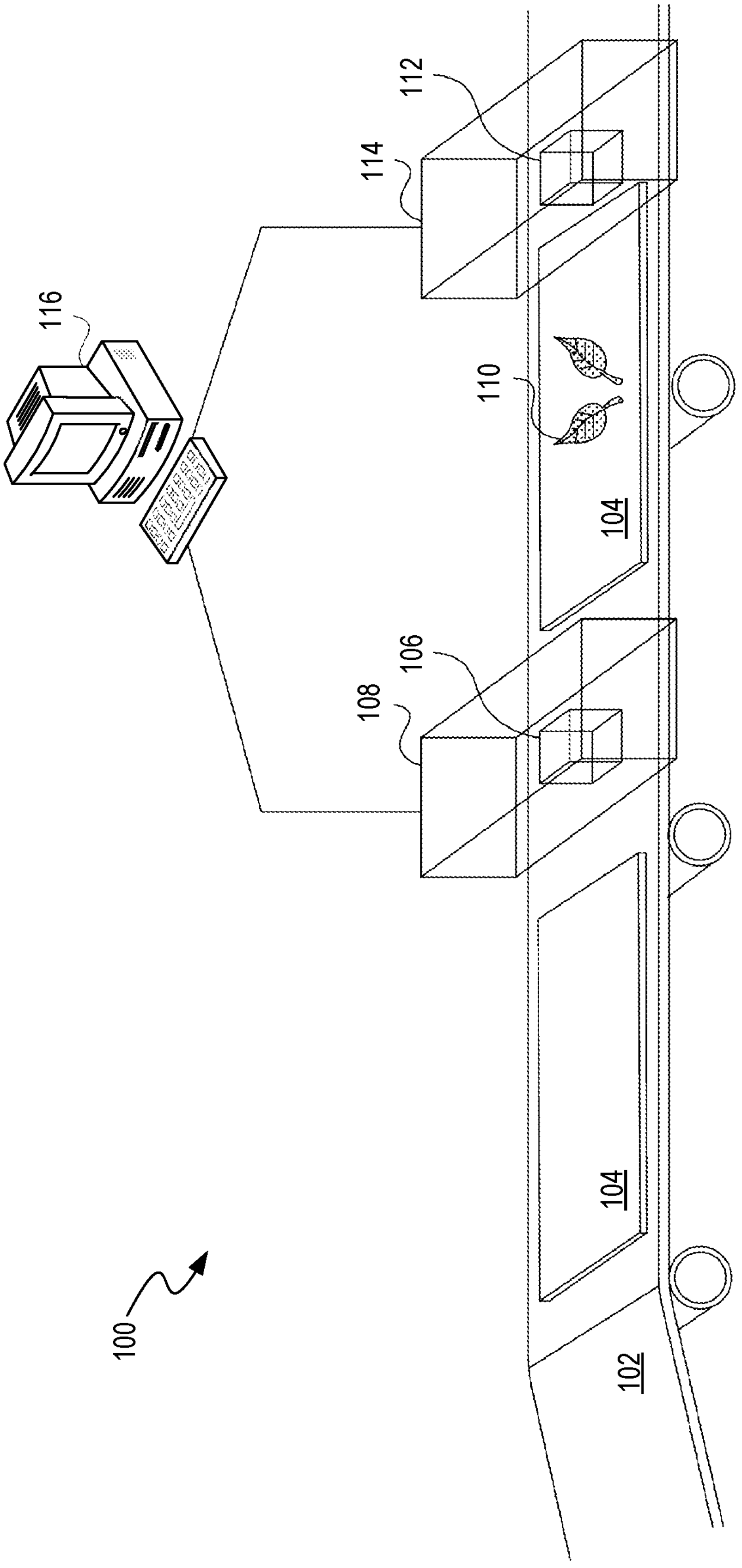
FIG. 1 is a block diagram illustrating a perspective view of a printing system, in accordance with one or more embodiments.

In the following description, for the purposes of explanation, numerous specific details are set forth in order to provide a thorough understanding of the present embodiments. It will be apparent, however, that the present embodiments may be practiced without these specific details.

This document presents methods, apparatuses and systems for drying color-printed substrates. In some aspects, a method for drying color-printed substrates, e.g., reducing energy consumption, for a printing system is provided. The method includes receiving, by the printing system, an image pattern for depositing ink onto a surface of a substrate to print the image pattern on the substrate, wherein the image pattern comprises a plurality of segments corresponding to a plurality of areas on the surface of the substrate. For each segment of the plurality of segments of the image pattern, one or more ink properties are determined of a corresponding portion of the ink to be deposited onto a corresponding area of the plurality of areas on the surface of the substrate.

Using one or more sensors of the printing system, a color of the substrate is determined onto which the image pattern is configured to be printed. For each segment of the plurality of segments of the image pattern, a corresponding energy level is determined based on the color of the substrate and the one or more ink properties of the corresponding portion of the ink to be deposited. The corresponding energy level is for a respective radiation lamp of one or more radiation lamps to dry the corresponding portion of the ink. For an array of lamps, at least one dimension of the array corresponds to the plurality of segments of the image pattern. Providing the corresponding energy level may cause reduced energy consumption for the printing system.

The advantages and benefits of the disclosed methods, systems, and apparatuses for drying color-printed substrates include reduced energy consumption for printing systems. For example, the systems and methods described herein enable dryers of printing systems to conserve around a third of energy consumed typically. Such reduction in energy consumption provides cost efficiencies as well as being environmental benefits. By avoiding the application of excess energy where it is not required, the disclosed methods reduce warping problems (e.g., warping in substrates when ink and substrates are subject to too much heat caused by excess energy) by more than 55%. Reduction in warping also reduces other problems in printing. For example, problems with warping cause issues when a varnish is applied over the substrate or when cutting the substrate. In some examples, due to the reduction of warping, the length of the machine physically and length of the process in time is shortened. Moreover, reducing the energy applied to substrates can obviate the need for cooling stations and cooling processes during printing procedures.

The methods and techniques herein also avoid certain image quality problems related to applying excess energy to ink and substrates. For example, applying too much heat and energy to some combinations and types of inks that do not require it can create the appearance of burn marks, e.g., in areas where black ink is used or areas where dark colors with a high absorptance rate are used. The disclosed methods enable drying of the substrate and ink from the inside to outside, e.g., by conduction, and using the heat transferred to evaporate the ink depending on the color of the substrate. The systems using methods and techniques described herein enable printing and drying of ink and substrates at higher speeds using a smaller drying station and enable automatic and dynamic adjustment of power applied to the substrate. Furthermore, the advantages of the convolutional neural network (CNN) used for machine learning (ML) in some disclosed embodiments include the obviation of feature extraction and the use of shared weight in convolutional layers, which means that the same filter (weights bank) is used for each node in the layer; this both reduces memory footprint and improves performance.

FIG. 1 is a block diagram illustrating a perspective view of a printing system 100, in accordance with one or more embodiments. The printing system 100 includes a printer head 106, at least one light source 112, and a transfer belt 102. Embodiments may include various combinations of these and other components, e.g., a dryer. For example, the light source 112 is present in some embodiments, but not in others. As another example, a dryer is included if an image 110 will not be quickly transferred to a substrate. In some examples, while the printing system 100 of FIG. 1 includes a transfer belt 102, other means for conveying and/or retaining a transfer material 104 are used, such as a rotating platform or stationary bed.

The printer head 106 is configured to deposit ink onto a transfer material 104 in the form of an image 110. The transfer material 104, which also referred to herein as a former material, is flexible, which allows the image 110 to be transferred to complex-shaped substrates. In one example, the transfer material 104 is a rubber former, a thermoformable material, etc. In some embodiments, the printer head 106 is an inkjet printer head that jets ink onto the transfer material 104 using, for example, piezoelectric nozzles. Thermal printer heads are generally avoided in an effort to avoid premature sublimation of the ink. In some embodiments, the ink is a solid energy, e.g., UV curable ink. However, other inks are also used, such as water-based energy curable inks or solvent-based energy curable inks. According to different embodiments, ink is deposited in different forms, such as ink droplets and colored polyester ribbons.

In some embodiments, one or more light sources 112 cure some or all of the ink deposited onto the transfer material 104 by emitting UV radiation. In some examples, the light source(s) 112 is any combination of UV fluorescent bulbs, UV light emitting diodes (LEDs), low-pressure, e.g., mercury (Hg), bulbs, or excited dimer (excimer) lamps and/or lasers. Various combinations of these light sources could be used. In some examples, a printing system 100 includes a low-pressure Hg lamp and a UV LED. As discussed in more detail with reference to FIG. 2, in some examples, the light source 112 is configured to emit UV radiation of a particular subtype.

The printer head 106 and light source 112 are illustrated as being directly adjacent to one another, i.e., neighboring without any intervening components. However, in other embodiments, additional components that assist in printing, curing, etc., are also be present. In some examples, multiple distinct light sources 112 is positioned behind the printer head 106. FIG. 1 illustrates one possible order in which components are arranged in order to print an image 110 onto the transfer material 104. Other embodiments are considered in which additional components are placed before, between, or after the illustrated components, etc.

In some embodiments, one or more of the aforementioned components are housed within one or more carriages. For example, the printer head 106 is housed within a printing carriage 108, the light source 112 is housed within a curing carriage 114, etc. In addition to protecting the components from damage, the carriages, in some examples, also serve other benefits. For example, the curing carriage 114 limits what part(s) of the transfer material 104 and image 110 are exposed during the curing process. In some examples, the printing system 100 includes pulleys, motors, rails, and/or any combination of mechanical or electrical technologies that enable the carriages to travel along the transfer belt 102, i.e., with respect to the transfer material 104. In alternative embodiments, the carriages are fixedly attached to a rail or base of the printing system 100. In these embodiments, the transfer material 104 is moved in relation to the printer head 106, light source 112, etc., such that ink is deposited onto the transfer material 104.

In various embodiments, some or all of the components are controlled by a computer system 116. The computer system 116 is the same as or similar to the computer system 500 illustrated and described in more detail with reference to FIG. 5. In some examples, the computer system 116 allows a user to input printing instructions and information, modify print settings, e.g., by changing cure settings, alter the printing process, etc.

Figure 2:
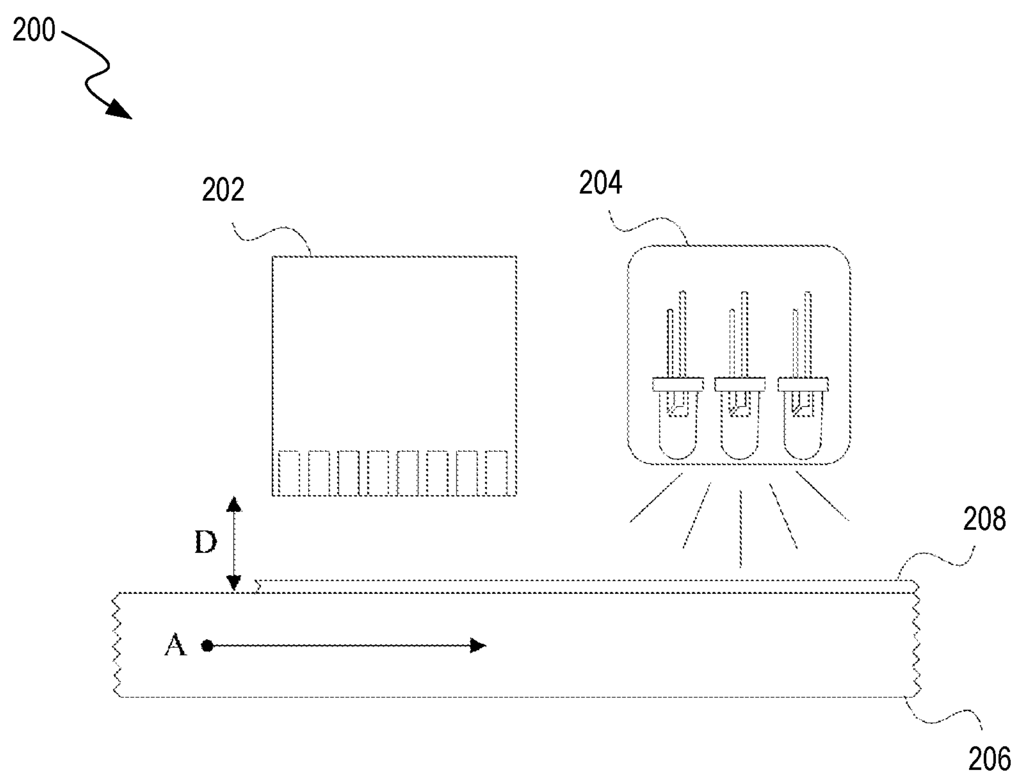
FIG. 2 is a block diagram illustrating a side view of a printing system, including a printer head and a light source, in accordance with one or more embodiments.

FIG. 2 is a block diagram illustrating a side view of a printing system 200, including a printer head 202 and a light source 204, in accordance with one or more embodiments. While a single-pass configuration is illustrated by FIG. 2, other embodiments employ multi-pass, i.e., scan, configurations. Similarly, embodiments can be modified for various printers, e.g., flatbed printer, drum printer, or lane printer. For example, a flatbed printer includes a stable bed and a traversing printer head, a stable printer head and a traversing bed, etc.

In some examples, the printer head 202 includes distinct ink/color drums, e.g., cyan, magenta, yellow, and key (CMYK), or colored polyester ribbons that are deposited onto the surface of a transfer material 206. Path A represents the media feed direction, e.g., the direction in which the transfer material 206 travels during the printing process. Path D represents the distance between the printer head 202 and the surface of the transfer material 206.

As described above, both direct and indirect printing have conventionally been carried out only on flat surfaces. The printing systems and methods described herein, however, allow images to be printed on complex-shaped, i.e., non-planar, surfaces by depositing ink directly onto a transfer material 206 and then transferring the ink to a substrate. When printing directly onto a surface, print quality relies on accuracy of ink drop placement. Therefore, maintaining a constant or nearly constant distance between the printer head 202 and the flat surface of the transfer material 206 is necessary. Airflow, velocity variability, etc., can affect drop placement even when the change in distance is small, e.g., a few millimeters.

In some embodiments, a light source 204 cures some or all of the ink 208 deposited onto the transfer material 206 by the printer head 202. In some examples, the light source 204 is configured to emit wavelengths of UV electromagnetic radiation of subtype V (UVV), subtype A (UVA), subtype B (UVB), subtype C (UVC), or any combination thereof. Generally, UVV wavelengths are those wavelengths measured between 395 nanometers (nm) and 445 nm, UVA wavelengths measure between 315 nm and 395 nm, UVB wavelengths measure between 280 nm and 315 nm, and UVC wavelengths measure between 100 nm and 280 nm. However, one skilled in the art will recognize these ranges are somewhat adjustable. For example, some embodiments characterize wavelengths of 285 nm as UVC.

In some examples, the light source 204 is, for example, a fluorescent bulb, a light emitting diode (LED), a low-pressure, e.g., mercury (Hg), bulb, or an excited dimer (excimer) lamp/laser. Combinations of different light sources could be used in some embodiments. Generally, the light source 204 is selected to ensure that the curing temperature does not exceed the temperature at which the ink 208 begins to sublime. For example, light source 204 of FIG. 2 is a UV LED lamp that generates low heat output and is used for a wider range of former types. UV LED lamps are associated with lower power consumption, longer lifetimes, and more predictable power output.

Alternatively, or additionally, other curing processes are also used, such as epoxy (resin) chemistries, flash curing, and electron beam technology. One skilled in the art will appreciate that many different curing processes could be adopted that utilize specific timeframes, intensities, rates, etc. In some embodiments, the intensity increases or decreases linearly or non-linearly, e.g., exponentially, logarithmically. In some embodiments, the intensity is altered using a variable resistor or alternatively by applying a pulse-width-modulated (PWM) signal to the diodes in the case of an LED light source. In some examples, the light is modulated using amplitude modulation, polarization modulation, frequency modulation (e.g., as in wavelength-division multiplexing (WDM)), phase modulation (e.g., angle phase control), temporal modulation, and/or the like.

Figure 3B:
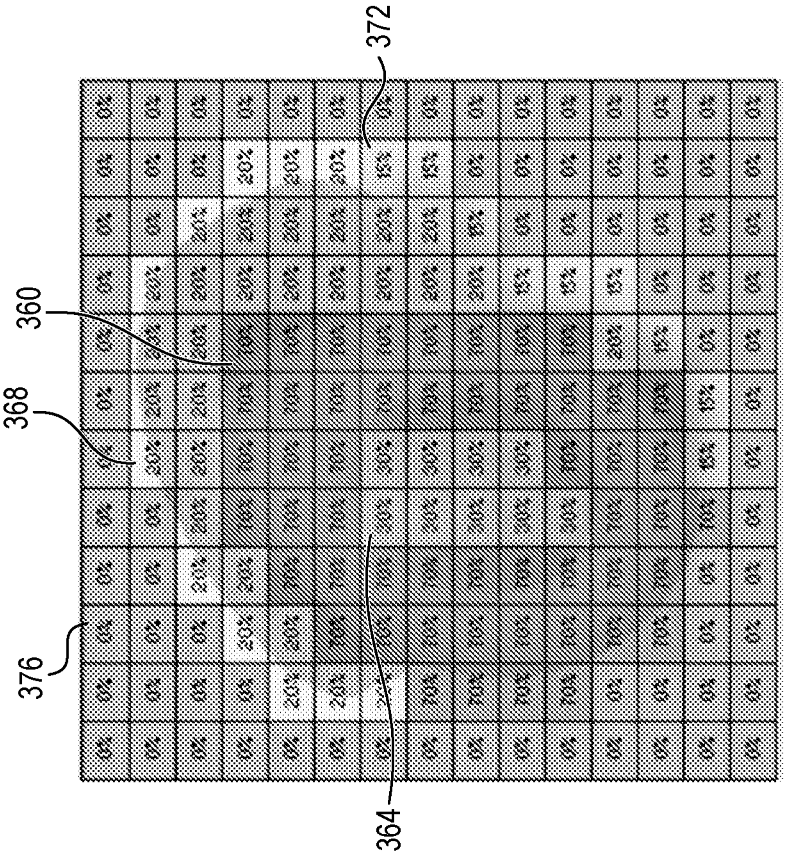
FIG. 3B is a drawing illustrating a part of a substrate, in accordance with one or more embodiments.
Figure 3A:
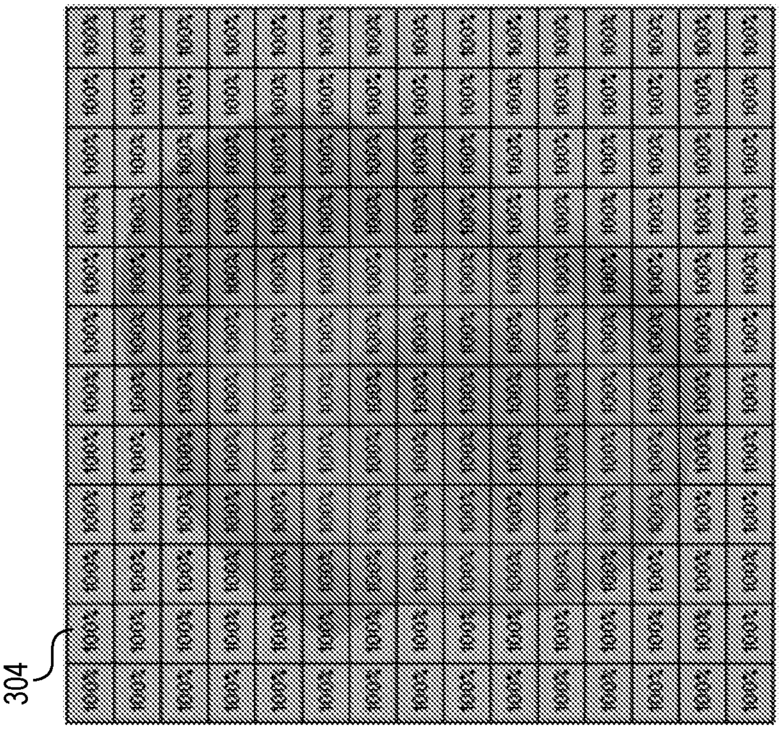
FIG. 3A is a drawing illustrating a part of a substrate printed using conventional methods, in accordance with one or more embodiments.

FIG. 3A is a drawing illustrating a part of a substrate printed using conventional methods, in accordance with one or more embodiments. As described herein, water-based inks are especially useful for digital printing due to the advantages they offer. Because of this, water-based inks are used over other inks in many applications. For example, water-based inks are considered to be more environmentally friendly and safe as they use water as a primary solvent rather than chemical solvents. Water-based inks are also low toxicity, biodegradable, safer for food packaging, energy efficient, and cost-effective.

Methods for drying water-based inks typically include absorption drying, evaporation drying, oxidation and polymerization drying, and radiation drying. There are different types of radiation drying depending on the wavelengths used. For example, the different types of radiation include ultraviolet radiation, infra-red radiation, microwave radiation and radio frequency. Infra-red (IR) drying methods enables higher speeds of printing. IR drying is able to dry ink in a shorter period of time, as it is able to transmit larger amounts of energy in a shorter period of time. The energy is subsequently absorbed by ink provided on a substrate. The energy allows the ink to heat until it reaches a temperature that causes the water within the water-based ink to evaporate. In some examples, the drying system takes approximately 1 second to 5 seconds to evaporate the water from the ink. The drying time depends on aspects such as absorption of substrate and/or primer, ink type, speed, applied energy, etc. Alternatively, or additionally, convection drying is used in the drying process. For example, a fan or heater is used to circulate air over the printed page to help quickly evaporate solvents and binders in ink.

Printing at high speeds can require a large amount of energy applied during IR drying, which corresponds to a large amount of power consumed. FIG. 3A illustrates a part of a substrate divided into a grid. For example, FIG. 3A illustrates ink deposited according to an image pattern, e.g., in this case, an image of two halves of an avocado. Using conventional methods, independent of the color or amount of ink to be applied to a portion 304 of the substrate shown by FIG. 3A, 100% of the energy is applied to provide 100% of the energy level. For example, even where there is no ink to be applied in portion 304 (according to the print pattern), the maximum amount of drying energy is applied.

Applying high amounts of energy to the substrate causes problems such as warping on the substrate, and burn marks. This is because conventional systems apply a uniform amount of power and heat to the substrate. Since a large amount of energy is needed to evaporate the water from the ink (e.g., water-based ink), a large amount of energy is consumed and applied to the entire substrate. Furthermore, as described herein, such techniques often require printers to include a cooling process. Hence, many dryers have a long second stage of cooling to address warping, other issues that stem from warping such as in the application of a varnish over the substrate, and/or issues with cutting the substrate on warped paper.

Because of these problems, the disclosed techniques are provided for dynamic adjustment of energy and energy level based on properties of each individual print process, such as properties of the ink to be deposited, and the properties of the substrate on which the ink is to be deposited.

FIG. 3B is a drawing illustrating a part of a substrate, in accordance with one or more embodiments. As described above, an image pattern is configured to be deposited onto the substrate of FIG. 3B, for example using a mechanism, such as an inkjet mechanism configured to deposit ink to print an image pattern onto a substrate. In the examples of FIG. 3A-B, the image pattern is that of two halves of an avocado. The image pattern includes a plurality of segments corresponding to a plurality of areas on the surface of the substrate, such as 364, 376, 368, 360 and 372. In different embodiments, an image pattern has a resolution ranging from 500 dots per inch (dpi) to 700 dpi, and a size of the substrate onto which to deposit the ink ranges from 10,000 square centimeters (sq. cm) to 20,000 sq. cm. Similarly, the number of segments of the image pattern ranges from 60,000 to 90,000 segments in different examples. In some examples, the number of segments, the image resolution, and/or size of the substrate varies based on the capacity of the drying system's sectorization, resolution of printing, type of ink used, and/or the like.

The system determines, for each segment of the image pattern, an ink property of a corresponding portion of the ink to be deposited onto a corresponding area of the plurality of areas on the surface of the substrate. For example, ink properties includes ink color, chemical composition, and/or an amount of ink to be deposited on, e.g., the portion or area of the substrate. Other ink properties include opacity, water resistance, drying time, lightfastness, viscosity, pH, and/or pigment concentration. For example, a system for printing receives the image pattern (e.g., via a wired or wireless network) and segments the image into pieces, such as 364, 376, 368, 360 and 372. According to some embodiments, the system segments the image pattern based into segments corresponding to an array of radiation lamps (e.g., a one-to-one ratio).

The system determines for each segment of the image pattern, the ink properties of a corresponding portion of the ink. For example, for segment 364, the system determines that a color of the ink to be deposited is dark green and black, and that an amount (e.g., volume) of ink to deposit is smaller. According to some embodiments, a volume of ink is adjusted, e.g., independent of the drying method described herein. The volume of ink used can range from 0 to 25 grams/square meter. For example, when a volume of ink is adjusted, e.g., by a user, the system recalculates the energy needed to dry the ink. For segment 376, the system determines that no ink is configured to be deposited. For segment 368, the system determines that a color of the ink to be deposited is dark green and that an amount of ink to deposit is smaller. For segment 360, the system determines that a color of the ink to be deposited is light green and that an amount of ink to deposit is larger. For segment 372, the system determines that a color of the ink to be deposited is gray and that an amount of ink to deposit is smaller.

The system also determines properties of the substrate onto which ink is being deposited, e.g., a color of the substrate, a thickness of the substrate, etc. For example, the system uses one or more sensors of the printing system to determine a color of the substrate, e.g., onto which the image pattern is configured to be printed. The system includes color sensors such as RGB sensors, CMYK sensors, spectrophotometer, colorimeter, infrared color sensors, ultraviolet-visible spectrophotometer, fluorescence sensor, and/or x-ray fluorescence sensors. For example, in the case of FIG. 3B, the substrate is white.

For each segment of the image pattern, the system determines, based on the color of the substrate and the one or more ink properties of the corresponding portion of the ink to be deposited, a corresponding energy level for a respective radiation lamp of the dryer. In some examples, the dryer includes an array of radiation lamps (e.g., one-dimensional (1D), two-dimensional (2D) array, and/or three-dimensional (3D) array) to dry the corresponding portion of the ink. In some examples, rather than an array, a single radiation lamp is included, and the power supplied to the single radiation lamp is modified based on properties described herein. As referred to herein, the radiation lamps include, for example, radiation lamps that provide at least one of ultraviolet radiation, infrared radiation, or microwave radiation, and/or any radiation lamps configured to transmit energy to the ink to evaporate water within the ink (e.g., arc lamps). Near infrared lamps, medium infrared lamps, or far infrared lamps can also be used.

In the example of FIG. 3B, individual radiation lamps are used to dry each portion of ink deposited corresponding to segments of the image pattern. Each of segments 364, 376, 368, 360 and 372 has corresponding radiation lamps. In some examples, at least one dimension of an array of radiation lamps corresponds to the plurality of segments of the image pattern. For example, a number of lamps in an array corresponds to a number of segments in a row. In some examples providing the corresponding energy level causes reducing energy consumption for the printing system.

According to some embodiments, the one or more ink properties comprise a color (e.g., one or more color values) of the corresponding portion of the ink to be deposited, and the system trains a model using training data comprising ink properties, substrate colors, energy level values, or energy consumed by a radiation lamp to dry ink having the color of the corresponding portion of the ink. The system extracts, for example, for each segment of the plurality of segments of the image pattern a feature vector from each segment of the image pattern, wherein the feature vector is indicative of one or more colors of a corresponding portion of the ink to be deposited onto a corresponding area of the substrate. An example feature vector is illustrated and described in more detail with reference to FIG. 9. The system inputs data (e.g., a feature vector) specifying the properties of the ink and/or substrate (e.g., color, volume, or amount of ink to be deposited) into the trained model. From an output of the trained model, an energy level or an amount of energy needed to generate the energy level is determined.

In some examples, the energy level corresponds to an efficient energy level for drying the ink and, for example, preventing warping. For example, determining the corresponding energy level includes inputting the color of the substrate onto which the image pattern is configured to be printed into a fitted model to provide the corresponding energy level. The fitted model describes the relationship between a response variable (e.g., the corresponding energy level) and one or more predictor variables (e.g., color, volume, or amount of ink to be deposited). The fitted model can use simple linear regression, multiple linear regression, analysis of variance (ANOVA), analysis of covariance (ANCOVA), or binary logistic regression. In the example of FIG. 3B, the system determines that segment 364 requires 30% energy level (e.g., of a maximum energy level), that segment 376 requires 0% energy level, segment 368 requires 20% energy level, segment 360 requires 70% energy level, and segment 372 requires 15% energy level.

The system deposits, e.g., by a mechanism, such as an inkjet mechanism of the printing system, the ink according to the image pattern onto the surface of the substrate. The system, using the radiation lamps, heats the ink deposited onto the surface of the substrate to dry the ink. For example, the system configures each radiation lamp to provide the corresponding energy level to the corresponding area on the surface of the substrate.

According to some examples, the system further adjusts, by one or more actuators, of the printing system, a belt speed of the printing system for passing the substrate proximate to the radiation lamps based on the color of the substrate and the one or more ink properties of the corresponding portion of the ink to be deposited. The belt speed is determined based on the ink properties, the amount of energy to be applied to the substrate to dry the ink, the color of the substrate, etc.

Figure 4:
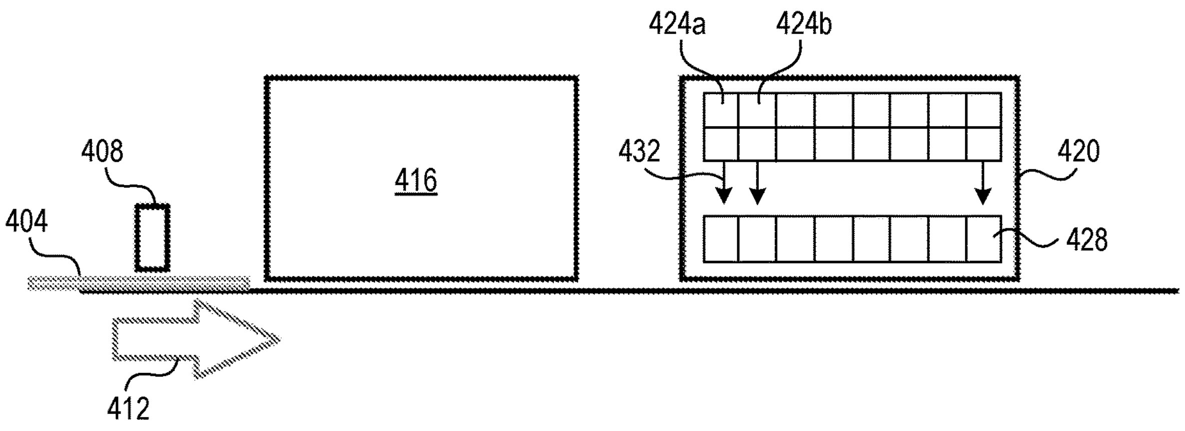
FIG. 4 is a drawing illustrating a printing system, in accordance with one or more embodiments.

FIG. 4 is a drawing illustrating a printing system, in accordance with one or more embodiments. As described herein, a printing system includes a mechanism, such as an inkjet mechanism, of printer 416 configured to deposit ink to print an image pattern onto a substrate 404, a color sensor 408 configured to determine a color of the substrate and radiation lamps, e.g., provided in a drying apparatus 420. The printing system further includes one or more processors configured to perform the methods and steps described herein.

In some examples, an analysis of the performance of the drying and warping of the substrate depending on the color of the substrate is first performed. The analysis is used to build a model (e.g., a fitted model) or train a machine learning model based on values of colors of substrates, absorption rates of energy of dryer radiation, and how conduction within the substrate affects the temperature rise and drying of the ink. For example, the analysis is used to develop a trained model (e.g., ML model, AI model, fitted model). The trained model is trained on properties of the ink and/or substrate. In some examples, the system extracts feature vectors of different colors of ink in corresponding segments of an image pattern and known light intensities for drying the ink/substrate (e.g., to increase drying speed, prevent warping, prevent burning). The properties include a color of ink, a volume or amount of ink to be deposited, a color of the substrate, and/or the like.

When a printing system, such as that of FIG. 4, receives an image pattern for printing, the color sensor, e.g., color sensor 408 at an input of the printer 416 will detect the color of the substrate as the substrate 404 enters the printing system of FIG. 4 in direction 412. Once the color is detected the system uses the trained model to determine the optimal energy level for drying the substrate (e.g., to compensate the drying power applied depending on that substrate). The printer 416 deposits the ink onto the substrate 404 and drying apparatus 420 dries the ink and substrate according to the optimal energy level determined using the model. For example, the drying apparatus includes one or more radiation lamps (e.g., 1D/2D array) where each radiation lamp corresponds to a specific portion of substrate and ink deposited on the specific portion of substrate. Radiation lamps 424*a*, 424*b* are configured to provide an energy level for drying a corresponding portion of substrate or image pattern. In some examples, the printing system configures each of the radiation lamps (e.g., radiation lamp 424*a* and radiation lamp 424*b*) to output an emitted light 432 having an energy level determined based on the specific ink and substrate properties of the corresponding portion.

In some implementations, the printing system includes a mask 428. The mask 428 is configured to selectively permit or block light emitted by a corresponding radiation lamp (e.g., radiation lamp 424*a*, radiation lamp 424*b*) onto the corresponding area. Light blocking elements or masking elements of mask 428 provide a faster energy modulation response for the dryer than modulating the power of the emitters from the radiation lamps. Mask 428 can include a grid of reflectors or liquid crystal display (LCD) masking (such as used in 3D printing).

Figure 5A:
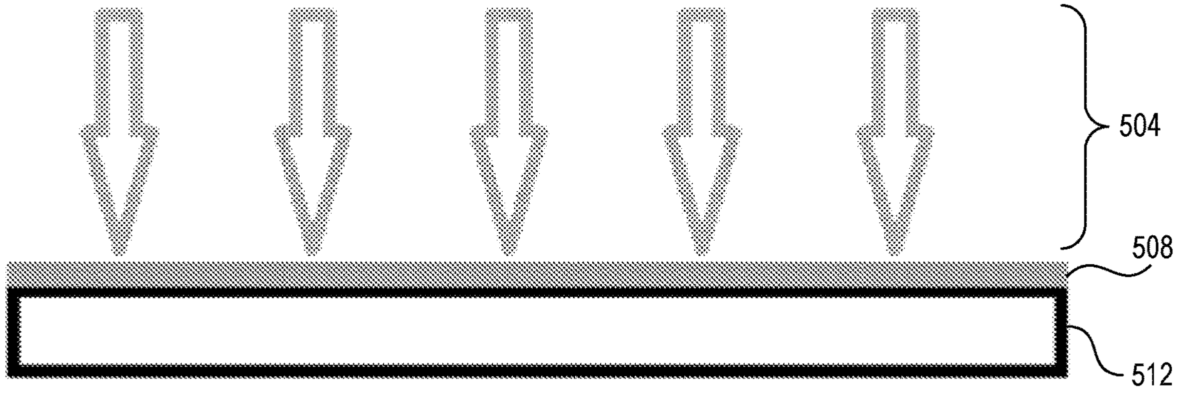
FIG. 5A is a drawing illustrating a printing process, in accordance with one or more embodiments.

FIG. 5A is a drawing illustrating a printing process, in accordance with one or more embodiments. In some examples, steps of the process are performed by drying apparatus 420 or a computer system such as that described with reference to FIG. 10. Some embodiments include different and/or additional steps or perform steps in different orders.

In some examples, the printing system determines properties of the substrate 512 and ink 508, e.g., using the image pattern received (e.g., a file indicating what is to be printed) and/or one or more sensors (e.g., a color sensor such as sensor 408). For example, the printing system determines that the substrate 512 of FIG. 5A has a color white and that the ink 508 to be deposited onto the substrate 512 has a color blue. As described herein, the system determines a corresponding energy level based on the properties of the substrate and/or ink, e.g., that would reduce drying speed, reduce warping, or conserve energy.

For example, the printing system extracts a feature vector from the each segment of the image pattern, wherein the feature vector is indicative of the color of the substrate and the one or more ink properties of the corresponding portion of the ink to be deposited and providing, using a trained model, the corresponding energy level based on the feature vector. Alternatively or additionally, the printing system inputs the color of the substrate onto which the image pattern is configured to be printed into a fitted model to provide the corresponding energy level.

In the example of FIG. 5A, given that the substrate is white, which is a low absorptance substrate, the drying energy to the ink is received mostly by radiation and/or convection. In this example, given that the substrate is white, the system determines to use higher energy and a higher energy level. In some embodiments, the system configures the radiation lamps to provide the energy level to the substrate to dry the ink. For example, IR waves 504 are provided by the radiation lamps.

Figure 5B:
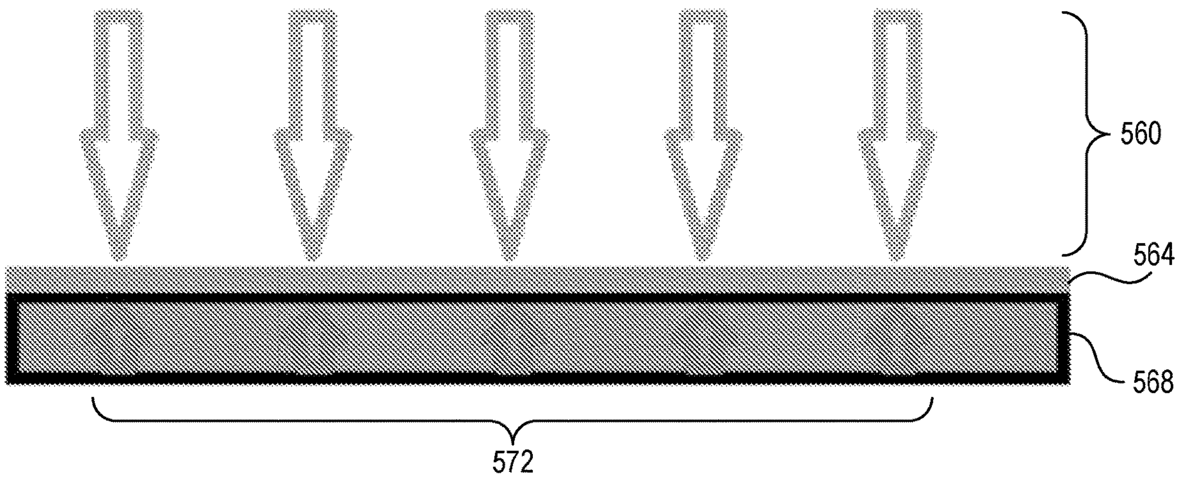
FIG. 5B is a drawing illustrating a printing process, in accordance with one or more embodiments.

FIG. 5B is a drawing illustrating a printing process, in accordance with one or more embodiments. In some examples, steps of the process are performed by drying apparatus 420, or a computer system such as that described with reference to FIG. 10. Some embodiments include different and/or additional steps or perform steps in different orders. In some embodiments, the printing system determines properties of the substrate 568 and ink 564, e.g., using the image pattern received (e.g., a file indicating what is to be printed) and/or one or more sensors (e.g., a color sensor such as sensor 408). For example, the printing system determines that the substrate 568 of FIG. 5B has a color brown and that the ink 564 to be deposited onto the substrate 568 has a color blue. As described herein, the system determines a corresponding energy level based on the properties of the substrate and/or ink, e.g., that would optimize drying, such as for speed, for reducing warping, for conserving energy, etc.

In the example of FIG. 5B, the brown substrate would absorb much more energy and dehydration of ink and substrate would occur faster and to a greater extent, therefore causing warping of the substrate. Moreover, applying heat and light via radiation lamps would not only induce IR waves 560, it would also apply further heat and drying to the substrate by conduction, since the brown substrate would collect and absorb the light and heat and retain it better than, for example, white substrate. Without adjusting the radiation lamps based on properties of ink and substrates, a same energy would be applied to a brown substrate and a white substrate, which results in warping and/or under-drying.

In case of having a brown or a high absorptance substrate, the amount of energy to dry the ink/substrate would be also emitted by conduction (e.g., conduction 572) due to the substrate absorbing the energy created by radiation (e.g., IR waves 560). Therefore, the system determines, based on the brown color of the substrate, to adjust the final radiation/convection energy required to compensate for conduction and optimize the system performance.

Figure 6:
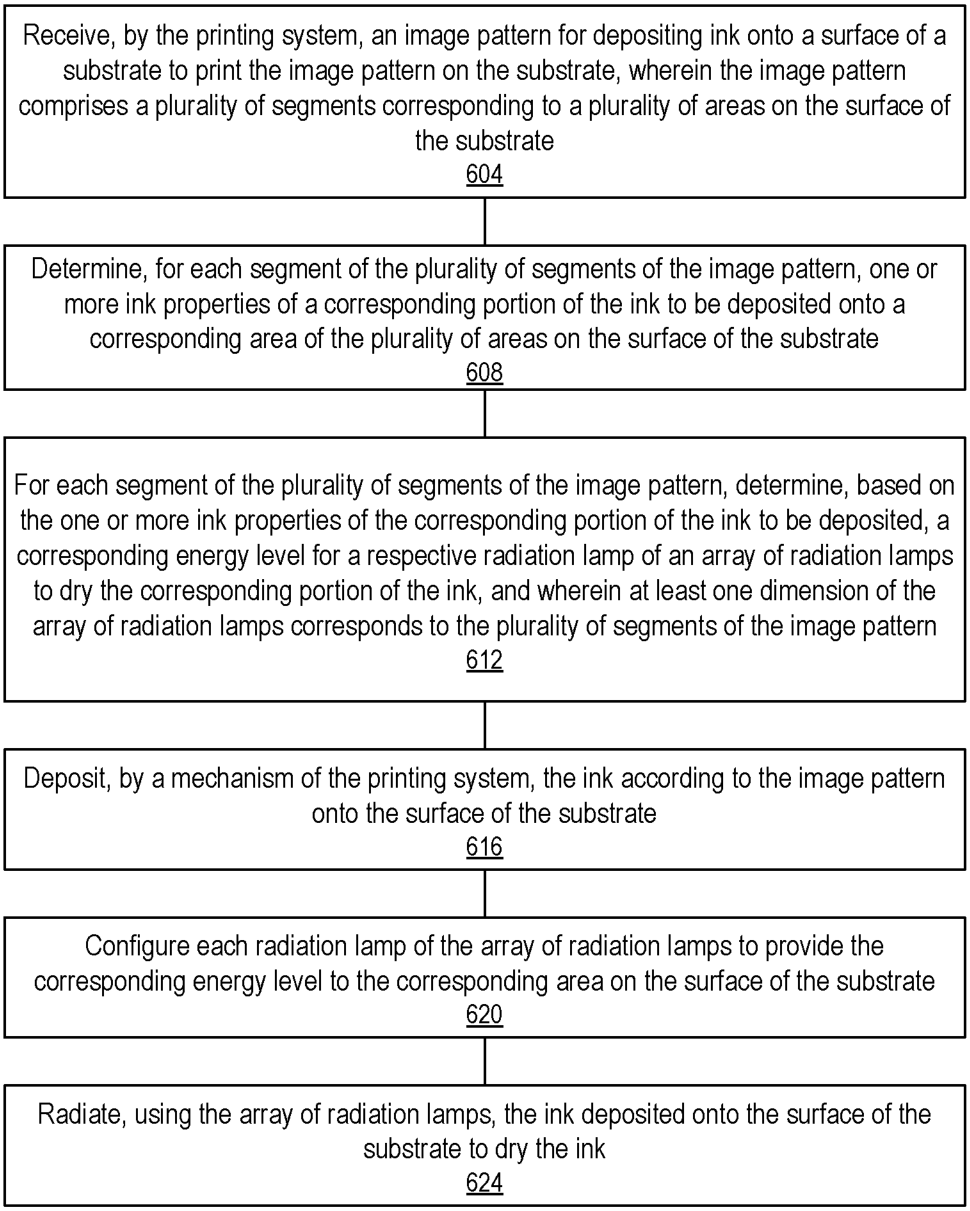
FIG. 6 is a flow diagram illustrating a process for drying color-printed substrates, in accordance with one or more embodiments.

FIG. 6 is a flow diagram illustrating a process for drying color-printed substrates, in accordance with one or more embodiments. For example, the method may be a method for dynamically modulating radiation energy in a printing system In some examples, steps of the process are performed by a printing system or a computer system such as that described with reference to FIG. 10. Example printing systems are illustrated and described in more detail with reference to FIGS. 3A-5. Some embodiments include different and/or additional steps or perform steps in different orders.

In step 604, a printing system receives, e.g., by a printing system, an image pattern for depositing ink onto a surface of a substrate to print the image pattern on the substrate. The image pattern comprises a plurality of segments corresponding to a plurality of areas on the surface of the substrate.

In step 608, the printing system determines, for each segment of the plurality of segments of the image pattern, one or more ink properties of a corresponding portion of the ink to be deposited onto a corresponding area of the plurality of areas on the surface of the substrate. For example, the one or more ink properties includes a volume of the corresponding portion of the ink to be deposited. Alternatively and/or additionally, the one or more ink properties include a color of the corresponding portion of the ink to be deposited. In some embodiments, the method further includes training the model using training data comprising at least the one or more ink properties, substrate colors, energy level values, and energy consumed by a radiation lamp to dry ink having the color of the corresponding portion of the ink.

In step 612, for each segment of the plurality of segments of the image pattern, the printing system determines, based on the color of the substrate and/or the one or more ink properties of the corresponding portion of the ink to be deposited, a corresponding energy level for a respective radiation lamp to dry the corresponding portion of the ink. In some embodiments, at least one dimension of an array of radiation lamps corresponds to the plurality of segments of the image pattern. Providing the corresponding energy level causes the reducing energy consumption for the printing system. In some examples, the dryer uses infrared radiation (IR) lamps.

According to some examples, determining the corresponding energy level includes extracting a feature vector from each segment of the image pattern, wherein the feature vector is indicative of the color of the substrate and the one or more ink properties of the corresponding portion of the ink to be deposited and providing, using a trained model, the corresponding energy level based on the feature vector. The corresponding energy level reduces an amount of energy consumed by a respective radiation lamp to dry the corresponding portion of the ink.

Alternatively, or additionally, determining the corresponding energy level includes inputting the color of the substrate onto which the image pattern is configured to be printed into a fitted model to provide the corresponding energy level.

In step 616, the printing system deposits the ink, e.g., by a mechanism of the printing system, according to the image pattern onto the surface of the substrate.

In step 620, the printing system configures each radiation lamp of the array of radiation lamps to provide the corresponding energy level to the corresponding area on the surface of the substrate.

In some examples, configuring the radiation lamps includes modulating a corresponding output power of each radiation lamp by adjusting a driving current or a driving voltage of each radiation lamp. For example, power modulation includes changing a power level by changing a frequency or phase. Alternatively or additionally, configuring the radiation lamps includes masking the radiation lamps to selectively permit or block light emitted by a corresponding radiation lamp of the radiation lamps onto the corresponding area. For example, this may be used in cases where an energy level must be modified in a short amount of time, such as an amount of time that would be exceeded if the radiation lamps were modulated by controlling an amount of energy provided to them.

In some examples, modulating the light includes masking one or more lamps. For example, masking includes selectively blocking certain lamps or parts of lamps to create a specific pattern or shape. This can be done using digital image processing to manipulate the light source in real-time (e.g., shutting off power supply to specific lamps), or physically (e.g., blocking specific lamps). For example, in areas of the substrate where no ink has been deposited or substantially no ink has been deposited, the printing system may not need to dry the substrate using lamps in those areas. As a result, the printing system masks the lamps to prevent the lamps from radiating heat/light to those areas. In some examples, rather than masking specific lamps (e.g., lamps corresponding to areas of the substrate where there is no ink deposited), the system lowers the energy and/or power provided to the lamps so that they maintain a lower level of energy level. By reducing the energy level but not turning the lamps off completely, the system reduces the time needed to increase the energy level and/or turn on a lamp, e.g., for a next portion of printing (e.g., a next print job).

In step 624, the printing system radiates, using the array of radiation lamps, the ink deposited onto the surface of the substrate to dry the ink. In some examples, the method further includes adjusting, by one or more actuators of the printing system, a belt speed of the printing system for passing the substrate proximate to the radiation lamps based on the color of the substrate and the one or more ink properties of the corresponding portion of the ink to be deposited.

In some examples, the printing system determines, a color of the substrate onto which the image pattern is configured to be printed. For example, one or more sensors, e.g., of the printing system may be used to determine the color of the substrate. For example, the system extracts a feature vector from each segment of the image pattern, wherein the feature vector is indicative of the color of the substrate and the one or more ink properties of the corresponding portion of the ink to be deposited.

Figure 7:
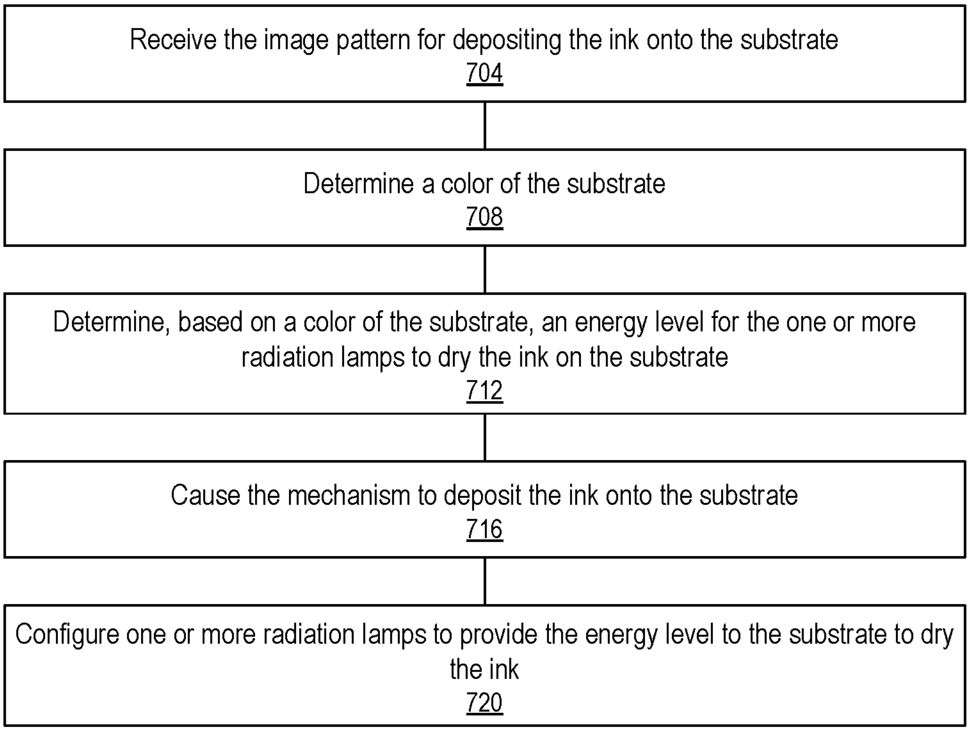
FIG. 7 is a flow diagram illustrating a process for drying color-printed substrates, in accordance with one or more embodiments.

FIG. 7 is a flow diagram illustrating a process for drying color-printed substrates, in accordance with one or more embodiments. In some examples, steps of the process are performed by a printing system or a computer system such as that described with reference to FIG. 10. Example printing systems are illustrated and described in more detail with reference to FIGS. 3A-5. For example, a printing system having reduced energy consumption includes a mechanism configured to deposit ink to print an image pattern onto a substrate. A color sensor is configured to determine a color of the substrate. The printing system includes one or more radiation lamps, and one or more processors coupled to the mechanism, the color sensor, and the radiation lamps (e.g., IR lamps). Some embodiments include different and/or additional steps or perform steps in different orders.

In step 704, the one or more processors receive an image pattern for depositing the ink onto the substrate. The image pattern includes a plurality of segments corresponding to a plurality of areas on a surface of the substrate. Additionally, in some embodiments, the one or more processors are configured to segment the image pattern into the plurality of segments corresponding to the radiation lamps.

In step 708, the one or more processors determines the color of the substrate. For example, the one or more processors may cause a color sensor of the system to determine the color of the substrate. In step 712, the one or more processors determine, based on the color of the substrate, an energy level for the radiation lamps to dry the ink on the substrate. Providing the energy level causes the reduced energy consumption for the printing system.

In some embodiments, the one or more processors are configured to determine the energy level by performing steps by obtaining, based on the color of the substrate, one or more color values and inputting one or more color values into a fitted model to determine an amount of energy needed to generate the energy level.

In some embodiments, the one or more processors determine, for each segment of a plurality of segments of the image pattern, one or more ink properties of a corresponding portion of the ink to be deposited onto a corresponding area of the plurality of areas on the surface of the substrate. For example, the one or more processors determine, for each segment of a plurality of segments of the image pattern, an amount of a corresponding portion of the ink to be deposited onto a corresponding area of the plurality of areas on the surface of the substrate.

In some embodiments, the one or more processors modify, based on the one or more ink properties of the corresponding portion of the ink, a corresponding energy level for a radiation lamp to dry the corresponding portion of the ink deposited onto the corresponding area. For example, the one or more processors modify, based on the amount of the corresponding portion of the ink, a corresponding energy level for a radiation lamp to dry the corresponding portion of the ink deposited onto the corresponding area.

In some embodiments, modifying the corresponding energy level includes extracting one or more features from each segment of the image pattern, wherein the feature vector is indicative of the one or more ink properties and providing, using a machine learning model, the modified corresponding energy level based on the one or more features. In some embodiments, the modified corresponding energy level reduces an amount of energy consumed by a respective radiation lamp to dry the corresponding portion of the ink. In some examples, modifying the corresponding energy level includes masking the one or more radiation lamps to selectively permit or block light emitted by a corresponding radiation lamp of the one or more radiation lamps onto a corresponding area.

In step 716, the one or more processors cause the mechanism to deposit the ink onto the substrate. In step 720, the one or more processors configure the radiation lamps to provide the energy level to the substrate to dry the ink.

Figure 8:
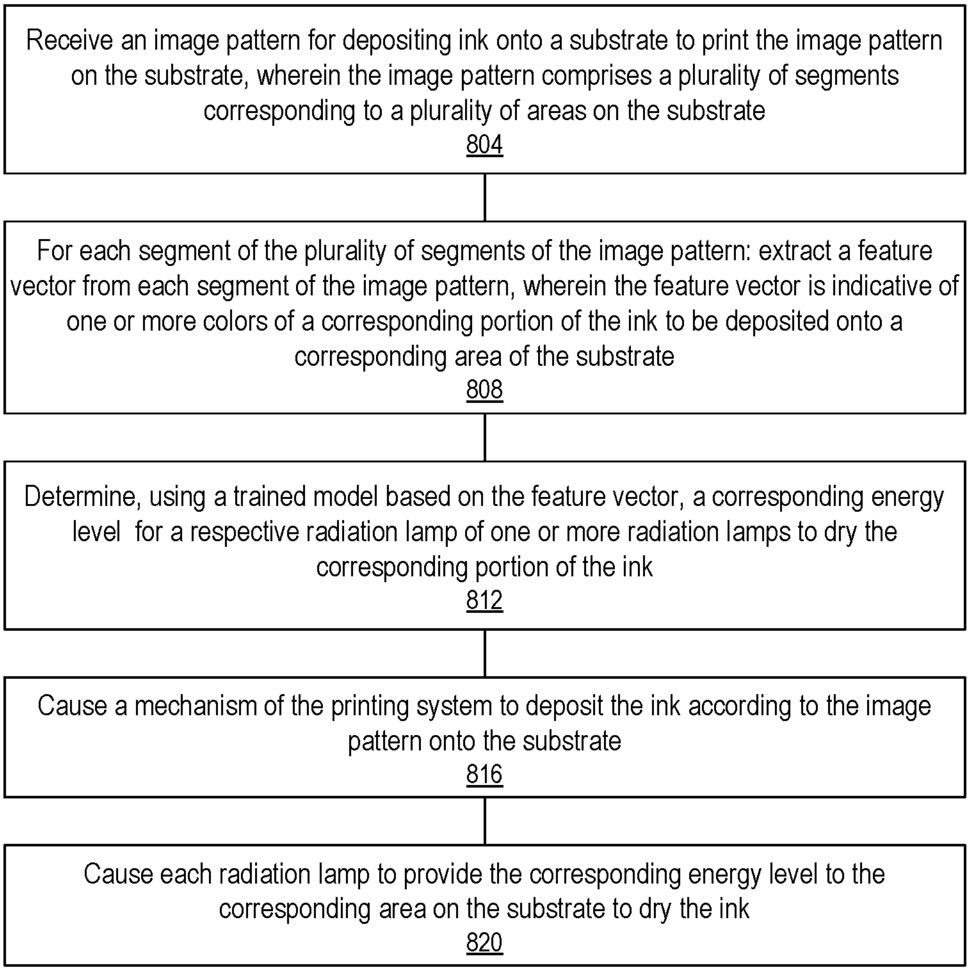
FIG. 8 is a flow diagram illustrating a process for drying color-printed substrates, in accordance with one or more embodiments.

FIG. 8 is a flow diagram illustrating a process for drying color-printed substrates, in accordance with one or more embodiments. In some examples, steps of the process are performed by a software application running on a remote computer or a mobile device, a printing system, or a computer system such as that described with reference to FIG. 10. Example printing systems are illustrated and described in more detail with reference to FIGS. 3A-5. Some embodiments include different and/or additional steps or perform steps in different orders.

In step 804, one or more processors receive an image pattern for depositing ink onto a substrate to print the image pattern on the substrate. In some examples, the ink is a water-based ink. The image pattern comprises a plurality of segments corresponding to a plurality of areas on the substrate. In some examples, a resolution of the image pattern is in a range from 500 dots per inch (dpi) to 700 dpi. In some embodiments, the substrate is in a range from 10,000 square centimeters (sq. cm) to 20,000 sq. cm. In some embodiments, the number of segments of the image pattern is in a range from 60,000 to 90,000.

In step 808, for each segment of the plurality of segments of the image pattern, the one or more processors extract a feature vector from each segment of the image pattern. The feature vector may be indicative of one or more colors of a corresponding portion of the ink to be deposited onto a corresponding area of the substrate.

In step 812, the one or more processors determine, using a trained model based on the feature vector, a corresponding energy level for a respective radiation lamp to dry the corresponding portion of the ink. In step 816, the one or more processors cause a mechanism of the printing system to deposit the ink according to the image pattern onto the substrate.

In step 820, the one or more processors cause each radiation lamp to provide the corresponding energy level to the corresponding area on the substrate to dry the ink. In some embodiments, causing each radiation lamp to provide the corresponding energy level to the corresponding area on the substrate to dry the ink prevents warping of the substrate. Alternatively or additionally, in some examples, the one or more processors further determine, based on the image pattern, that an area of the substrate is to be free of ink and turn off a corresponding radiation lamp to avoid radiation the area.

In some examples, causing each radiation lamp to provide the corresponding energy level to the corresponding area on the substrate to dry the ink enables the one or more processors to control a belt speed of the printing system; and reduce a time that each radiation lamp is turned on to dry the ink.

In some examples, a single lamp is used. In some examples, an array of radiation lamps is used, such as a two-dimensional (2D) array or a one-dimensional (1D) array. In some embodiments, an array of heat lamps is configured to provide at least one of ultraviolet radiation, infrared radiation, or microwave radiation, near infrared lamps, medium infrared lamps, or far infrared lamps and transmits energy to the ink to evaporate water within the ink. In some embodiments, each radiation lamp provides the corresponding energy level to dry the ink by at least one of radiation or convection, and a portion of energy provided by each radiation lamp is absorbed by the substrate and transmitted to the ink by conduction.

In some examples, the one or more processors further cause a color sensor to one or more color values of the substrate and modify, based on one or more color values, a corresponding amount of energy used for each heat lamp to dry the corresponding portion of the ink. For example, modifying the corresponding amount of energy includes inputting one or more color values into a fitted model to determine a modification to the corresponding amount of energy to dry the corresponding portion of the ink and configuring each heat lamp based on the modification to the corresponding amount of energy.

In some embodiments, the one or more processors further perform additional tasks, such as to instruct the printing system to provide a jet of air to expedite drying of the ink or instruct the printing system to cool the substrate after drying of the ink and apply a varnish to the substrate.

Figure 9:
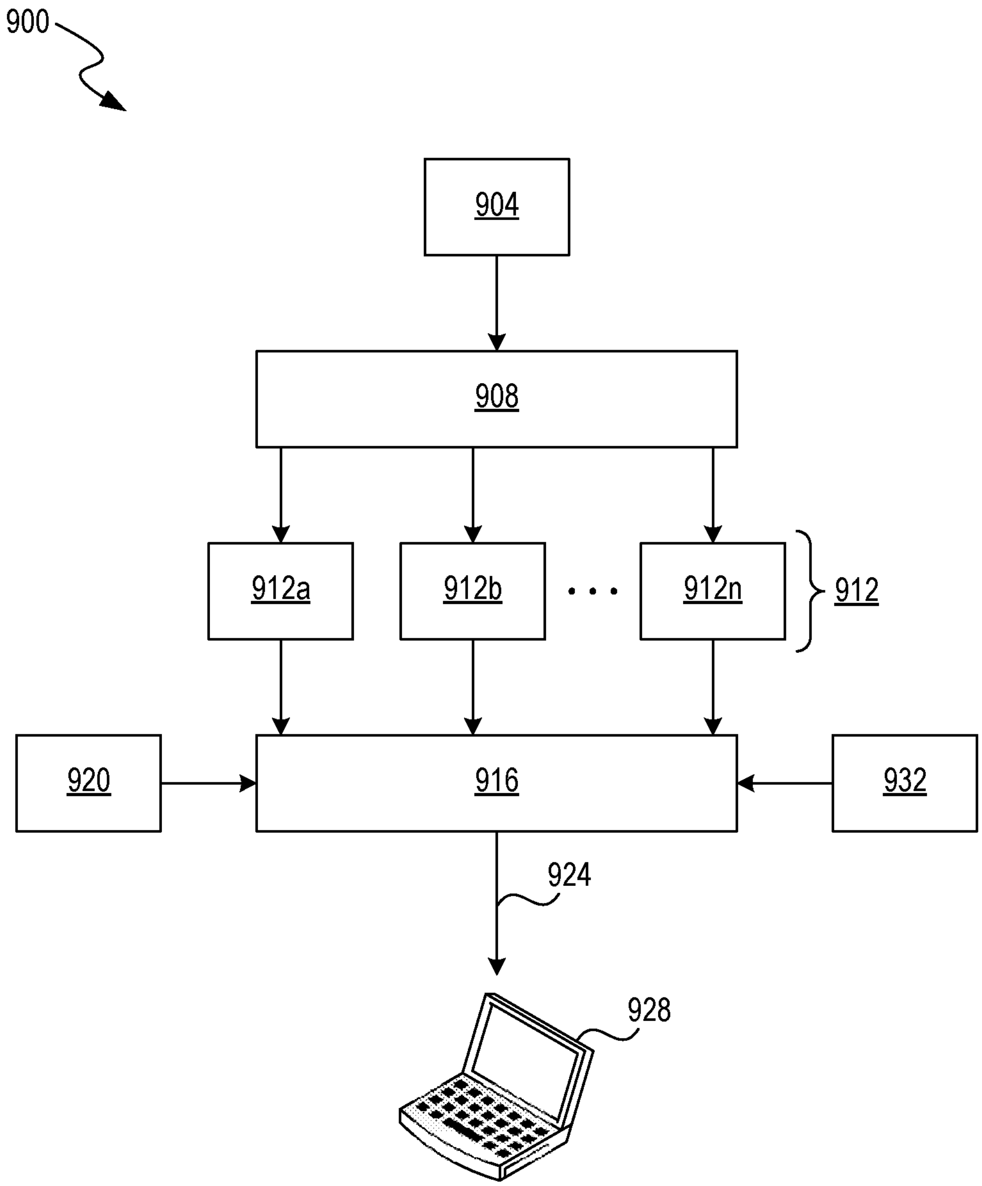
FIG. 9 is a block diagram illustrating an example machine learning system, in accordance with one or more embodiments.

FIG. 9 is a block diagram illustrating an example machine learning (ML) system 900. The ML system 900 is implemented using components of the example computer system 400 illustrated and described in more detail with reference to FIG. 10. For example, the ML system 900 is implemented on the computer system 1000 using instructions 1008 programmed in the main memory 1006 illustrated and described in more detail with reference to FIG. 10. Likewise, embodiments of the ML system 900 includes different and/or additional components or be connected in different ways. The ML system 900 is sometimes referred to as a ML module.

Figure 10:
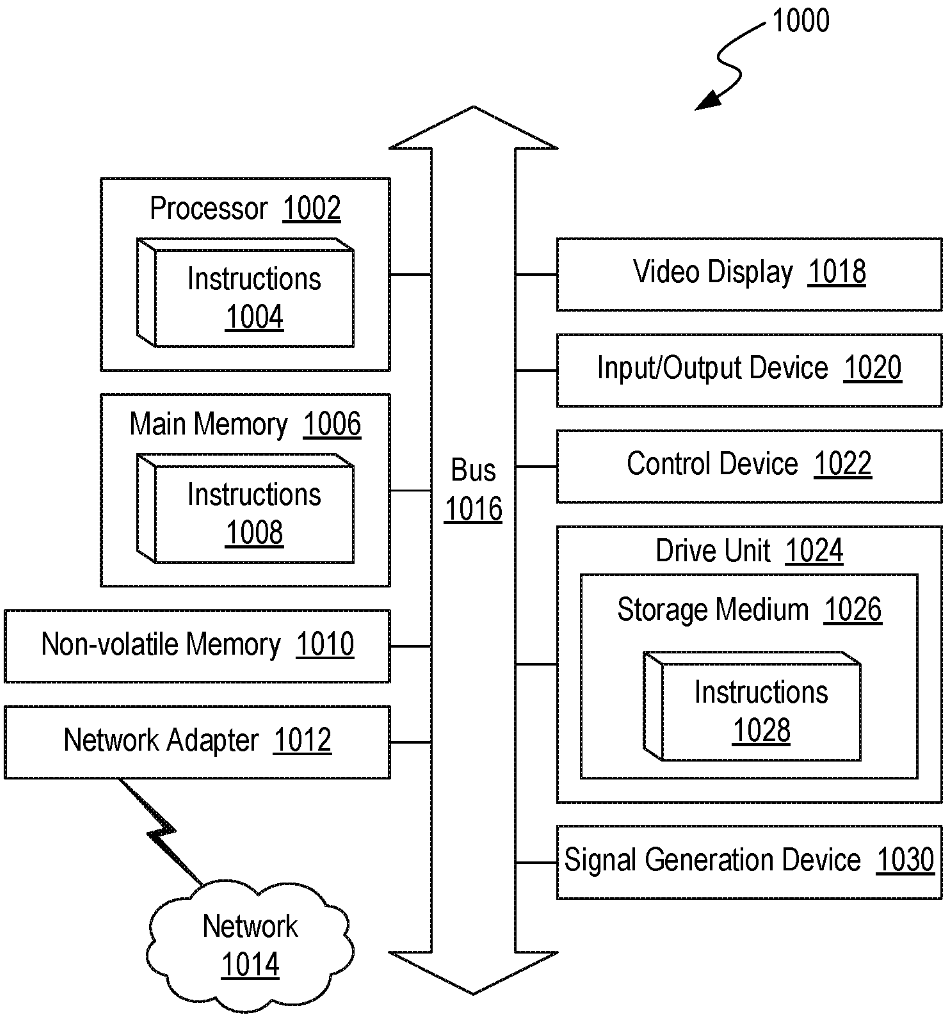
FIG. 10 is a block diagram illustrating an example computer system, in accordance with one or more embodiments.

The ML system 900 includes a feature extraction module 908 implemented using components of the example computer system 1000 illustrated and described in more detail with reference to FIG. 10. In some embodiments, the feature extraction module 908 extracts a feature vector 912 from input data 904. In some examples, input data 904 includes properties of ink to be deposited on a substrate, or properties of the substrate onto which the ink is to be deposited. For example, the input data is a feature vector of different colors of ink in corresponding segments of an image pattern. In some embodiments, the properties include a color of ink, a volume or amount of ink to be deposited, a color of the substrate, and/or the like. The feature vector 912 includes features 912*a*, 912*b*, . . . , 912*n*. The feature extraction module 908 reduces the redundancy in the input data 04, e.g., repetitive data values, to transform the input data 904 into the reduced set of features in feature vector 912, e.g., features 912*a*, 912*b*, . . . , 912*n*. The feature vector 912 contains the relevant information from the input data 904, such that, in some examples, events or data value thresholds of interest are identified by the ML model 916 by using this reduced representation. In some example embodiments, the following dimensionality reduction techniques are used by the feature extraction module 908: independent component analysis, Isomap, kernel principal component analysis (PCA), latent semantic analysis, partial least squares, PCA, multifactor dimensionality reduction, nonlinear dimensionality reduction, multilinear PCA, multilinear subspace learning, semidefinite embedding, autoencoder, and deep feature synthesis.

In some embodiments, the ML model 916 performs deep learning (also known as deep structured learning or hierarchical learning) directly on the input data 904 to learn data representations, as opposed to using task-specific algorithms. In deep learning, no explicit feature extraction is performed; the features of feature vector 912 are implicitly extracted by the ML system 900. In one example, the ML model 916 uses a cascade of multiple layers of nonlinear processing units for implicit feature extraction and transformation. Each successive layer uses the output from the previous layer as input. In some examples, the ML model 916 thus learns in supervised (e.g., classification) and/or unsupervised (e.g., pattern analysis) modes. In some examples, the ML model 916 learns multiple levels of representations that correspond to different levels of abstraction, wherein the different levels form a hierarchy of concepts. In this manner, the ML model 916 is configured to differentiate features of interest from background features.

In one example, the ML model 916, e.g., in the form of a CNN generates the output 924, without the need for feature extraction, directly from the input data 904. In some examples, the output 924 is provided to the computer device 928 or video display 418. The computer device 928 is a server, computer, tablet, smartphone, smart speaker, etc., implemented using components of the example computer system 400 illustrated and described in more detail with reference to FIG. 4. In some embodiments, the steps performed by the ML system 900 are stored in memory on the computer device 928 for execution.

A CNN is a type of feed-forward artificial neural network in which the connectivity pattern between its neurons is inspired by the organization of a visual cortex. Individual cortical neurons respond to stimuli in a restricted area of space known as the receptive field. The receptive fields of different neurons partially overlap such that they tile the visual field. In some examples, the response of an individual neuron to stimuli within its receptive field is approximated mathematically by a convolution operation. CNNs are based on biological processes and are variations of multilayer perceptrons designed to use minimal amounts of preprocessing.

In some examples, the ML model 916 is a CNN that includes both convolutional layers and max pooling layers. In some examples, the architecture of the ML model 916 is "fully convolutional," which means that variable sized sensor data vectors can be fed into it. In some examples, for all convolutional layers, the ML model 916 specifies a kernel size, a stride of the convolution, and an amount of zero padding applied to the input of that layer. In some examples, for the pooling layers, the model 216 specifies the kernel size and stride of the pooling.

In some embodiments, the ML system 900 trains the ML model 916, based on the training data 920, to correlate the feature vector 912 to expected outputs in the training data 920. In some examples, training data 920 includes properties of ink to be deposited on a substrate, or properties of the substrate onto which the ink is to be deposited and a corresponding energy level that reduces energy consumption for drying the ink/substrate, e.g., in terms of reducing warping, speed, efficiency, etc. As part of the training of the ML model 916, the ML system 900 forms a training set of features and training labels by identifying a positive training set of features that have been determined to have a desired property in question, and, in some embodiments, forms a negative training set of features that lack the property in question.

The ML system 900 applies ML techniques to train the ML model 916, that when applied to the feature vector 912, outputs indications of whether the feature vector 912 has an associated desired property or properties, such as a probability that the feature vector 912 has a particular Boolean property, or an estimated value of a scalar property. In some examples, the ML system 900 further applies dimensionality reduction (e.g., via linear discriminant analysis (LDA), PCA, or the like) to reduce the amount of data in the feature vector 912 to a smaller, more representative set of data.

In some examples, the ML system 900 uses supervised ML to train the ML model 916, with feature vectors of the positive training set and the negative training set serving as the inputs. In some embodiments, different ML techniques, such as linear support vector machine (linear SVM), boosting for other algorithms (e.g., AdaBoost), logistic regression, naïve Bayes, memory-based learning, random forests, bagged trees, decision trees, boosted trees, boosted stumps, neural networks, CNNs, etc., are used. In some example embodiments, a validation set 932 is formed of additional features, other than those in the training data 920, which have already been determined to have or to lack the property in question. The ML system 900 applies the trained ML model 916 to the features of the validation set 932 to quantify the accuracy of the ML model 916. Common metrics applied in accuracy measurement include precision and recall, where precision refers to a number of results the ML model 916 correctly predicted out of the total it predicted, and recall is a number of results the ML model 916 correctly predicted out of the total number of features that had the desired property in question. In some embodiments, the ML system 900 iteratively re-trains the ML model 916 until the occurrence of a stopping condition, such as the accuracy measurement indication that the ML model 916 is sufficiently accurate, or a number of training rounds having taken place. In some examples, the validation set 932 includes data corresponding to [update per specific application], or combinations thereof. This allows the detected values to be validated using the validation set 932. In some examples, the validation set 932 is generated based on analysis to be performed. FIG. 10 is a block diagram illustrating an example computer system 1000, in accordance with one or more embodiments. In some examples, components of the example computer system 1000 is used to implement the systems illustrated and described in more detail with reference to FIGS. 1, 2, 3, 4 and 5. According to some embodiments, at least some operations described with reference to FIG. 6-8 is implemented on the computer system 1000.

In some examples, the computer system 1000 includes one or more central processing units ("processors") 1002, main memory 1006, non-volatile memory 1010, network adapter 1012 (e.g., network interface), video display 1018, input/output devices 1020, control device 1022 (e.g., keyboard and pointing devices), drive unit 1024 including a storage medium 1026, and a signal generation device 1030 that are communicatively connected to a bus 1016. The bus 1016 is illustrated as an abstraction that represents one or more physical buses and/or point-to-point connections that are connected by appropriate bridges, adapters, or controllers. In some examples, the bus 1016, therefore, includes a system bus, a Peripheral Component Interconnect (PCI) bus or PCI-Express bus, a HyperTransport or industry standard architecture (ISA) bus, a small computer system interface (SCSI) bus, a universal serial bus (USB), an IIC (I2C) bus, or an Institute of Electrical and Electronics Engineers (IEEE) standard 1394 bus (also referred to as "Firewire").

In some examples, the computer system 1000 shares a similar computer processor architecture as that of a desktop computer, tablet computer, personal digital assistant (PDA), mobile phone, game console, music player, wearable electronic device (e.g., a watch or fitness tracker), network-connected ("smart") device (e.g., a television or home assistant device), virtual/augmented reality system (e.g., a head-mounted display), or another electronic device capable of executing a set of instructions (sequential or otherwise) that specify action(s) to be taken by the computer system 1000.

While the main memory 1006, non-volatile memory 1010, and storage medium 1026 (also called a "machine-readable medium") are shown to be a single medium, the term "machine-readable medium" and "storage medium" should be taken to include a single medium or multiple media (e.g., a centralized/distributed database and/or associated caches and servers) that store one or more sets of instructions 1028. The term "machine-readable medium" and "storage medium" shall also be taken to include any medium that is capable of storing, encoding, or carrying a set of instructions for execution by the computer system 1000.

In general, the routines executed to implement the embodiments of the disclosure can be implemented as part of an operating system or a specific application, component, program, object, module, or sequence of instructions (collectively referred to as "computer programs"). The computer programs typically include one or more instructions (e.g., instructions 1004, 1008, 1028) set at various times in various memory and storage devices in a computing device. When read and executed by the one or more processors 1002, the instruction(s) cause the computer system 1000 to perform operations to execute elements involving the various aspects of the disclosure.

Moreover, while embodiments have been described in the context of fully functioning computing devices, those skilled in the art will appreciate that the various embodiments are capable of being distributed as a program product in a variety of forms. The disclosure applies regardless of the particular type of machine or computer-readable media used to actually effect the distribution.

Further examples of machine-readable storage media, machine-readable media, or computer-readable media include recordable-type media such as volatile and non-volatile memory devices 1010, floppy and other removable disks, hard disk drives, optical disks (e.g., Compact Disk Read-Only Memory (CD-ROMS), Digital Versatile Disks (DVDs)), and transmission-type media such as digital and analog communication links.

The network adapter 1012 enables the computer system 1000 to mediate data in a network 1014 with an entity that is external to the computer system 1000 through any communication protocol supported by the computer system 1000 and the external entity. In some examples, the network adapter 1012 includes a network adapter card, a wireless network interface card, a router, an access point, a wireless router, a switch, a multilayer switch, a protocol converter, a gateway, a bridge, a bridge router, a hub, a digital media receiver, and/or a repeater.

In some embodiments, the network adapter 1012 includes a firewall that governs and/or manages permission to access/proxy data in a computer network and tracks varying levels of trust between different machines and/or applications. In some examples, the firewall is any number of modules having any combination of hardware and/or software components able to enforce a predetermined set of access rights between a particular set of machines and applications, machines and machines, and/or applications and applications (e.g., to regulate the flow of traffic and resource sharing between these entities). In some embodiments, the firewall additionally manages and/or has access to an access control list that details permissions including the access and operation rights of an object by an individual, a machine, and/or an application, and the circumstances under which the permission rights stand.

According to some embodiments, the techniques introduced here are implemented by programmable circuitry (e.g., one or more microprocessors), software and/or firmware, special-purpose hardwired (i.e., non-programmable) circuitry, or a combination of such forms. In some examples, special-purpose circuitry is in the form of one or more application-specific integrated circuits (ASICs), programmable logic devices (PLDs), field-programmable gate arrays (FPGAs), etc.

The description and drawings herein are illustrative and are not to be construed as limiting. Numerous specific details are described to provide a thorough understanding of the disclosure. However, in certain instances, well-known details are not described in order to avoid obscuring the description. Further, various modifications can be made without deviating from the scope of the embodiments.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, but no special significance is to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only and is not intended to further limit the scope and meaning of the disclosure or of any exemplified term. Likewise, the disclosure is not limited to various embodiments given in this specification.

It is to be understood that the embodiments and variations shown and described herein are merely illustrative of the principles of this invention and that various modifications may be implemented by those skilled in the art.

What is claimed is:

1. A method for dynamically modulating radiation energy in a printing system, the method comprising:

receiving, by the printing system, an image pattern for depositing ink onto a surface of a substrate to print the image pattern on the substrate, wherein the image pattern comprises a plurality of segments corresponding to a plurality of areas on the surface of the substrate;

determining, for each segment of the plurality of segments of the image pattern, one or more ink properties of a corresponding portion of the ink to be deposited onto a corresponding area of the plurality of areas on the surface of the substrate;

for each segment of the plurality of segments of the image pattern, determining, based on the one or more ink properties of the corresponding portion of the ink to be deposited, a corresponding energy level for a respective radiation lamp of an array of radiation lamps to dry the corresponding portion of the ink, wherein at least one dimension of the array of radiation lamps corresponds to the plurality of segments of the image pattern;

depositing, by a mechanism of the printing system, the ink according to the image pattern onto the surface of the substrate;

configuring each radiation lamp of the array of radiation lamps to provide the corresponding energy level to the corresponding area on the surface of the substrate; and radiating, using the array of radiation lamps, the ink deposited onto the surface of the substrate to dry the ink.

2. The method of claim 1, wherein determining the corresponding energy level comprises:

extracting a feature vector from each segment of the image pattern, wherein the feature vector is indicative of the one or more ink properties of the corresponding portion of the ink to be deposited; and providing, using a trained model, the corresponding energy level based on the feature vector.

3. The method of claim 2, wherein the one or more ink properties comprise a color of the corresponding portion of the ink to be deposited, the method comprising:

training the model using training data comprising at least the one or more ink properties, substrate colors, energy level values, and energy consumed by a radiation lamp to dry ink having the color of the corresponding portion of the ink.

4. The method of claim 1, further comprising determining a color of the substrate onto which the image pattern is configured to be printed.

5. The method of claim 1, wherein the array of radiation lamps comprises at least one of infrared radiation lamps, ultraviolet energy lamps, arc lamps, or excimers.

6. The method of claim 1, wherein the one or more ink properties comprise a volume of the corresponding portion of the ink to be deposited.

7. The method of claim 1, wherein configuring each radiation lamp of the array of radiation lamps to provide the corresponding energy level comprises:

modulating a corresponding output power of each radiation lamp by adjusting a driving current or a driving voltage of each radiation lamp; or masking the radiation lamps to selectively permit or block light emitted by a corresponding radiation lamp of the radiation lamps onto the corresponding area.

8. The method of claim 1, wherein determining the corresponding energy level for a respective radiation lamp of an array of radiation lamps uses information about properties of the substrate determined using an output from one or more sensors.

9. A printing system, comprising:

a mechanism configured to deposit ink to print an image pattern onto a substrate;

one or more radiation lamps; and one or more processors coupled to the mechanism and the one or more radiation lamps, the one or more processors configured to:

receive the image pattern for depositing the ink onto the substrate;

determine a color of the substrate;

determine, based on a color of the substrate, an energy level for the one or more radiation lamps to dry the ink on the substrate;

cause the mechanism to deposit the ink onto the substrate; and configure one or more radiation lamps to provide the energy level to the substrate to dry the ink.

10. The printing system of claim 9, wherein the image pattern comprises a plurality of segments corresponding to a plurality of areas on a surface of the substrate, and wherein the one or more processors are configured to:

determine, for each segment of a plurality of segments of the image pattern, one or more ink properties of a corresponding portion of the ink to be deposited onto a corresponding area of the plurality of areas on the surface of the substrate; and modify, based on the one or more ink properties of the corresponding portion of the ink, a corresponding energy level for a radiation lamp of the one or more radiation lamps to dry the corresponding portion of the ink deposited onto the corresponding area.

11. The printing system of claim 10, wherein the one or more processors are configured to modify the corresponding energy level by performing steps to:

extract one or more features from each segment of the image pattern to generate a feature vector, wherein the feature vector is indicative of the one or more ink properties; and provide, using a machine learning model, the modified corresponding energy level based on the one or more features.

12. The printing system of claim 9, wherein configuring the one or more radiation lamps to provide the energy level comprises:

masking the one or more radiation lamps to selectively permit or block light emitted by a corresponding radiation lamp of the one or more radiation lamps onto a corresponding area.

13. The printing system of claim 9, wherein the one or more processors are configured to determine the energy level by performing steps to:

obtain, based on the color of the substrate, one or more color values; and input the one or more color values into a fitted model to determine an amount of energy needed.

14. The printing system of claim 9, wherein the one or more processors are configured to:

determine, for each segment of a plurality of segments of the image pattern, an amount of a corresponding portion of the ink to be deposited onto a corresponding area of a plurality of areas on a surface of the substrate; and modify, based on the amount of the corresponding portion of the ink, a corresponding energy level for a radiation lamp of the one or more radiation lamps to dry the corresponding portion of the ink deposited onto the corresponding area.

15. The printing system of claim 9, wherein the one or more processors are configured to:

segment the image pattern into a plurality of segments corresponding to the one or more radiation lamps.

16. The printing system of claim 9, further comprising a color sensor, and wherein the one or more processors are configured to determine the color of the substrate comprises using one or more outputs of the color sensor.

17. A non-transitory, computer readable medium for optimizing energy consumption for a printing system, the medium storing instructions that, when executed by one or more processors, cause the one or more processors to:

receive an image pattern for depositing ink onto a substrate to print the image pattern on the substrate, wherein the image pattern comprises a plurality of segments corresponding to a plurality of areas on the substrate;

for each segment of the plurality of segments of the image pattern:

extract a feature vector from each segment of the image pattern, wherein the feature vector is indicative of one or more colors of a corresponding portion of the ink to be deposited onto a corresponding area of the substrate, and determine, using a trained model based on the feature vector, a corresponding energy level for a respective radiation lamp of one or more radiation lamps to dry the corresponding portion of the ink;

cause a mechanism of the printing system to deposit the ink according to the image pattern onto the substrate; and cause each radiation lamp to provide the corresponding energy level to the corresponding area on the substrate to dry the ink.

18. The non-transitory, computer readable medium of claim 17, wherein the instructions cause the one or more processors to:

determine, using a color sensor, one or more color values of the substrate; and modify, based on the one or more color values, a corresponding amount of energy used for each radiation lamp of the one or more radiation lamps to dry the corresponding portion of the ink.

19. The non-transitory, computer readable medium of claim 18, wherein the instructions to modify the corresponding amount of energy cause the one or more processors to:

input the one or more color values into a fitted model to determine a modification to the corresponding amount of energy to dry the corresponding portion of the ink; and configure each radiation lamp based on the modification to the corresponding amount of energy.

20. The non-transitory, computer readable medium of claim 17, wherein the one or more radiation lamps comprises at least one of near infrared lamps, medium infrared lamps, or far infrared lamps.

* * * * *